United States Patent [19]
Kim et al.

[11] Patent Number: 5,838,679
[45] Date of Patent: Nov. 17, 1998

[54] ASYNCHRONOUS TRANSFER MODE (ATM) MULTI-CHANNEL SWITCH WITH STRUCTURE OF GROUPING/TRAP/ROUTING

[75] Inventors: Hyup Jong Kim; Kyeong Soo Kim; Chan Pak, all of Daejeon, Rep. of Korea

[73] Assignees: Electronics and Telecommunications Research Institute, Daejeon; Korea Telecommunication Authority, Seoul, both of Rep. of Korea

[21] Appl. No.: 499,071

[22] Filed: Jul. 6, 1995

[30]   Foreign Application Priority Data

Dec. 15, 1994  [KR]  Rep. of Korea ................ 1994-34513
Dec. 21, 1994  [KR]  Rep. of Korea ................ 1994-35747

[51] Int. Cl.$^6$ ..................................................... H04L 12/56
[52] U.S. Cl. ........................................... 370/395; 370/411
[58] Field of Search ................................ 370/58.1, 58.2, 370/58.3, 60, 60.1, 94.1, 94.2, 94.3, 68.1, 351, 389, 395, 411

[56]   References Cited

U.S. PATENT DOCUMENTS 4,893,304   1/1990   Giacopelli et al. ................. 370/411

OTHER PUBLICATIONS

"Broadband Multi–Channel Switch with Multimcasting Capability", Patent GB040932232 Multichannel ATM Switch with Preserved Packet Sequence, Hyong S. Kim, 1992.

"Design and Analysis of a Multilink Access Subsystem Based on the Batcher–Banyan Network Architecture", Peter S. Y. Lau & Alberto Leon–Garcia, *IEEE Transactions on Communications*, vol. 40, No. 11, Nov. 1992.

Primary Examiner—Benedict V. Safourek
Assistant Examiner—Seema S. Rao
Attorney, Agent, or Firm—Jacobson, Price, Holman & Stern, PLLC

[57]   ABSTRACT

The present invention relates to an Asynchronous Transfer Mode (ATM) multi-channel switch with a structure of grouping/trap/routing that, by designating a port as a group, could accept not only the services having higher speed than the speed of input ports, but also the services having super-rate speed by comprising: an input processing unit for executing reading control of externally inputted cells and adjusting synchronization between an externally inputted cell and a cell returned by blocking and feedback; a channel grouping unit for grouping cells outputted from the input processing unit, according to switching control data; a trapping unit for deciding whether cells grouped in the channel grouping means require switching beyond the capacity of the pertinent channel and, if these cells require switching beyond the capacity of the channel, sending them to the input processing unit by feedback; and a routing unit for routing cells outputted from the trapping unit.

8 Claims, 15 Drawing Sheets

ASYNCHRONOUS TRANSFER MODE (ATM) MULTI-CHANNEL SWITCH WITH STRUCTURE OF GROUPING/TRAP/ROUTING

BACKGROUND OF THE INVENTION

The present invention relates to an Asynchronous Transfer Mode multi-Channel switch with a Structure of grouping/trap/routing and, in particular, relates to an ATM multi-channel switch with a structure of grouping/trap/routing which divides multiple ports into several groups and processes cells in group units.

An conventional ATM cell switching method switches a cell from one input port to a specific output port, that is, it has a structure of one-to-one correspondence between one input port and one output port.

Another conventional multi-channel switch, as shown in FIG. 1, divides multiple ports into several groups and has a structure of one-to-one correspondence between one input group and one output group. Thus, cells inputted through one input port of an arbitrary input port group could be outputted to a desired output port group but not to a specific output port of the desired output port group. That is, an inputted cell could only be destined for an arbitrary output port of the desired output port group without maintaining cell sequence. Hence, conventional multi-channel switches could not maintain cell sequence in a same destined channel group without any additional logic circuits that has performed to maintain cell sequence in a same channel group.

SUMMARY OF THE INVENTION

It is therefore an object of the present invention to solve the aforementioned problems by providing an ATM multi-channel switch with a structure of grouping/trap/routing which accepts not only services of higher speed than that of the input port but also services of super-rate speed by specifying an output port as an output port group without any manipulation to maintain cell sequence order.

In order to attain the foregoing objects, an ATM multi-channel switch according to the present invention comprises: an input processing means for executing reading control of externally inputted cells and adjusting synchronization between an externally inputted cell and a cell returned by blocking and feedback; a channel grouping means for grouping cells outputted from the input processing means, according to switching control data; a trapping means for deciding whether cells grouped in the channel grouping means require switching beyond the capacity of the pre-assigned channel and, if these cells require switching beyond the capacity of the channel, sending them to the input processing means by feedback; and a routing means for routing cells outputted from the trapping means.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 1:
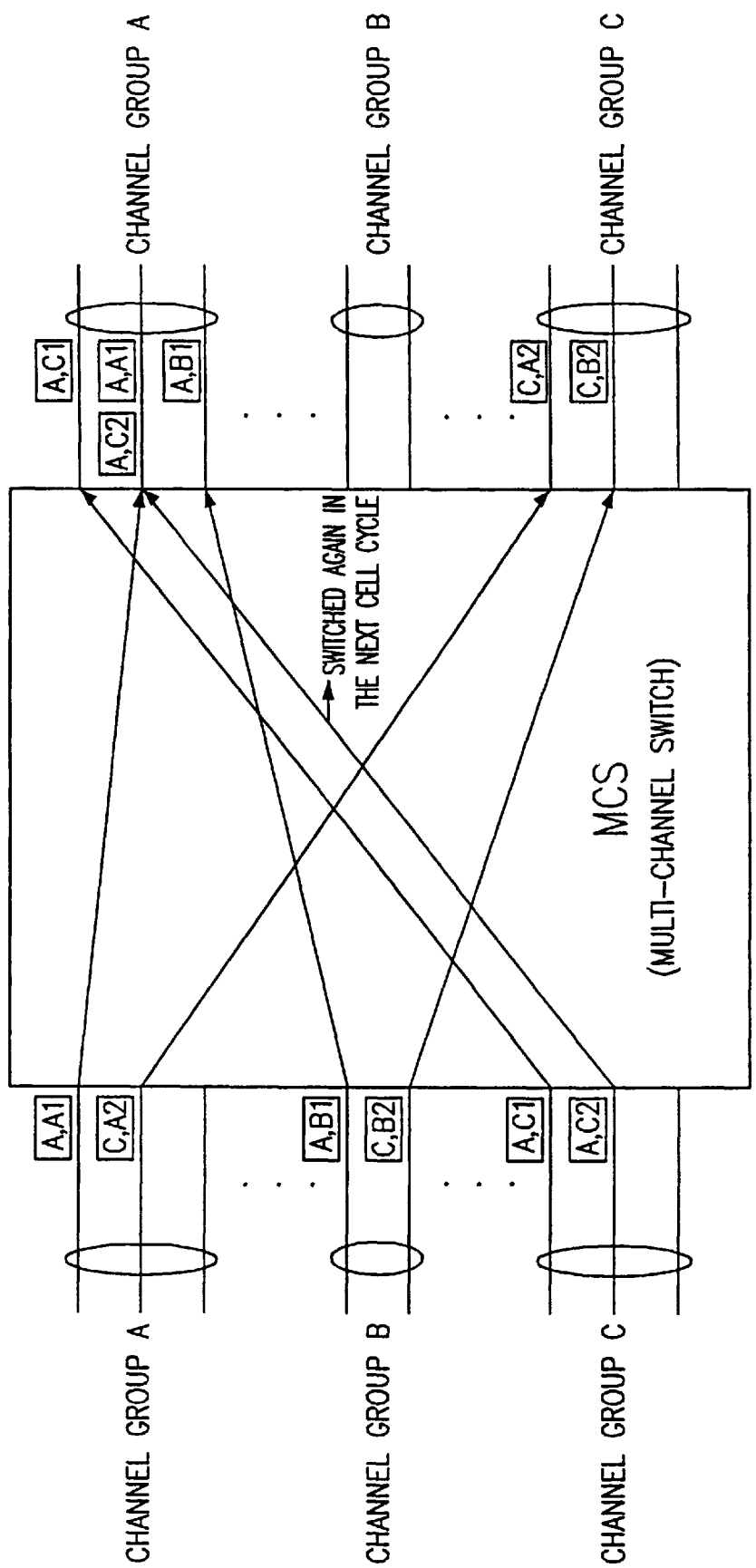
FIG. 1 is a diagram showing the function of a conventional multi-channel switch.
Figure 2:
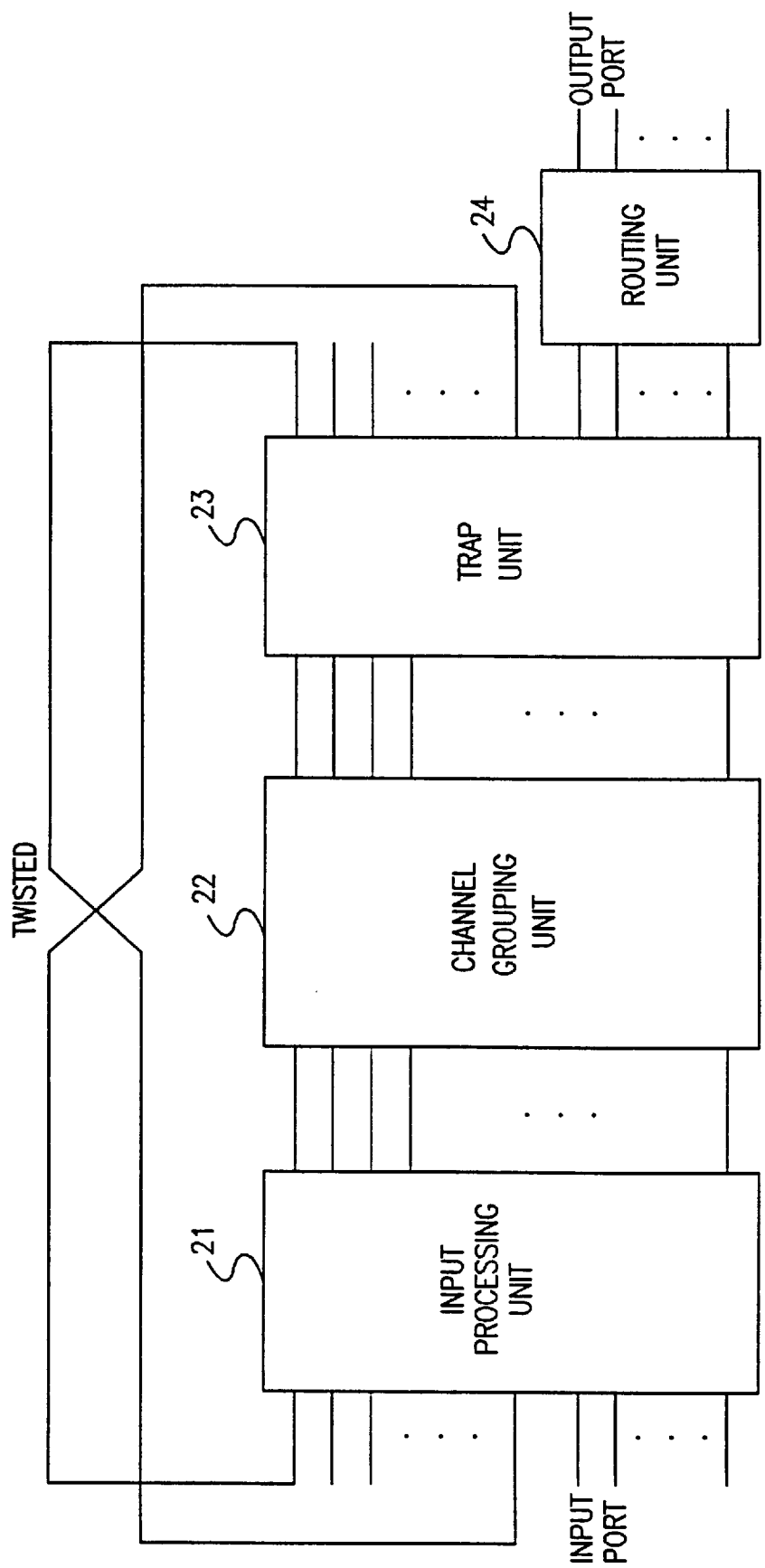
FIG. 2 is a diagram showing the structure of a multi-channel switch according to the present invention.

FIG. 2 shows the structure of a multi-channel switch according to the present invention. This switch consists of the input processing unit 21, the channel grouping unit 22, the trapping unit 23, and the routing unit 24.

The input processing unit 21 executes reading control of externally inputted cells and adjusts synchronization between an externally inputted cell and a cell returned by blocking and feedback in the trapping unit 23 and controls the transmission of switching control data to the channel grouping unit 22.

The channel grouping unit 22, using switching control data inputted to the unit, groups inputted cells by outputting cells inputted in a same channel group to continuously adjacent output port indexed, for example, by M, M+1, M+2, . . . , etc. The trapping unit 23 decides whether cells grouped in the channel grouping unit require switching beyond the capacity of a pre-assigned channel and, if these cells require switching beyond the capacity of a pre-assigned channel, sends them to the input processing unit by feedback. These returned cells will again be inputted to the input processing unit simultaneously with externally inputted cells at the next cell time. Suppose, channel group A has N output ports and N+X inputted cells require switching to channel group A. Then the trapping unit 23 outputs N cells to the routing unit 24 and sends the remaining X cells to the input ports of the channel grouping unit by feedback. Each cell to be outputted to the routing unit 24 is assigned the port number of output port by adding GSP to SN (refer FIG. 11). The routing unit 24, in the present invention, uses a Banyan network which is a self routing network.

The switch according to the present invention separates the path of switching the control cells from the path of the data cell and switches the data cells after first setting the data path by switching the control cells. Therefore, the control cells and the data cells must be multiplexed in the inside of the switch and this switch must quicken the switching speed by the clock numbers which the data cells and the control cells together require.

Figure 3:
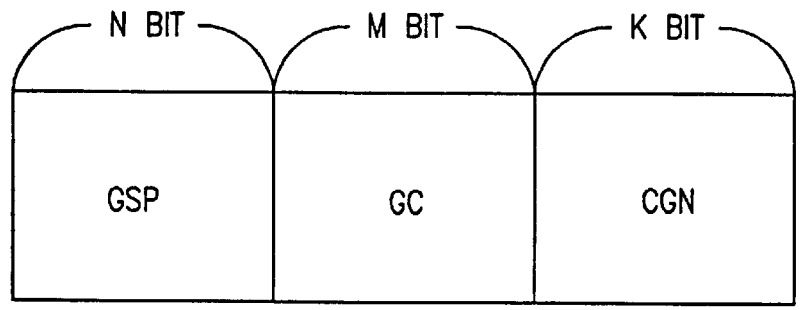
FIG. 3 is a diagram showing the format structure of a switching control data cell used in the present invention.

FIG. 3 shows the structure of control data inputted to set the paths of a multi-channel switch according to the present invention. Channel Group Number (CGN) field indicates the channel group number pertinent to a cell to be switched, Group Capacity (GC) field indicates the maximum number of output ports assigned to the channel group, and Group Start Port (GSP) field indicates the output port number with which the channel group starts. The total number of input ports is $2^{K-1}$ (total number of input ports =$2^{K-1}$, K=CGN bits. For example, if the total number of input ports is 16, CGN bits (K) is 5. If Group A has four ports, Group B has three ports, and Group C has two ports, the values of GSP of the cells to be outputted to Groups A, B, C are 0, 4, 7, respectively.

Figure 4:
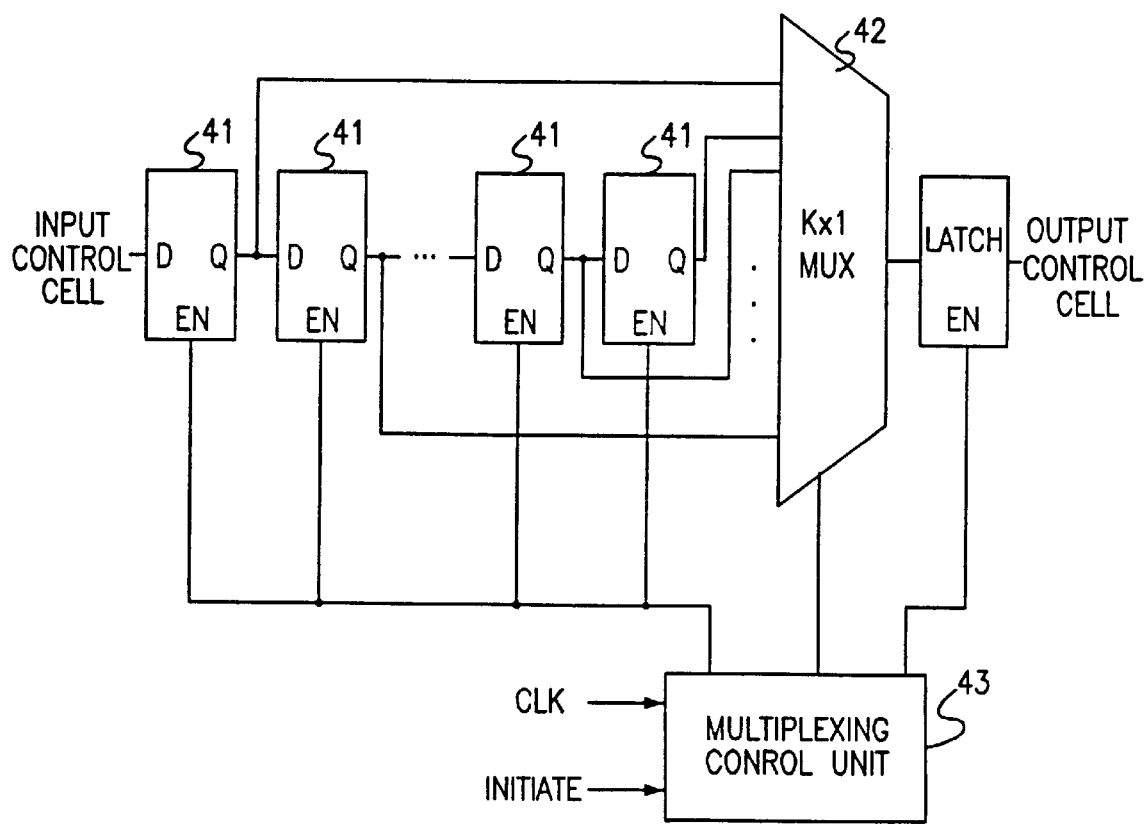
FIG. 4 is a diagram showing a detailed structure of the input processing unit shown in FIG. 2.

FIG. 4 shows the detailed Structure of an input processing unit. Control data having a structure as shown in FIG. 3 is inputted to serially connected D Flip-Flop (DFF) 41 which has K columns (The number of columns are determined by the number of input ports. For example, in case the number of input ports is 16, that is, the total CGN is 16, four bits are needed to represent 16 different binary numbers which are used for designating 16 channel groups, respectively. Further, one bit is more needed to represent unassigned cells. Hence, the CGN bits(K) is 5. Next, the multiplexer 42 multiplexes cells outputted from each DFF. After one bit of CGN is inputted to a DFF, Non-Block Group Network NBGN denotes the channel grouping unit 22) as shown in FIG. 2 needs r (N=2 exp r, N=number of ports for externally inputted cells plus ports for cells reinputted by feedback) clocks to complete the operation thereof and the paths of NBGN are set when the operation thereof is completed. Thus, the multiplexing control unit 43 outputs one bit of CGN and, after r clocks are passed, controls the output of the next bit of CGN, thus enables CGN value of K bits to set K-column NBGN. At the time when the NBGN completes operation thereof for one bit of CGN outputted from the multiplexer 42, next bit of CGN is latched.

Figure 5:
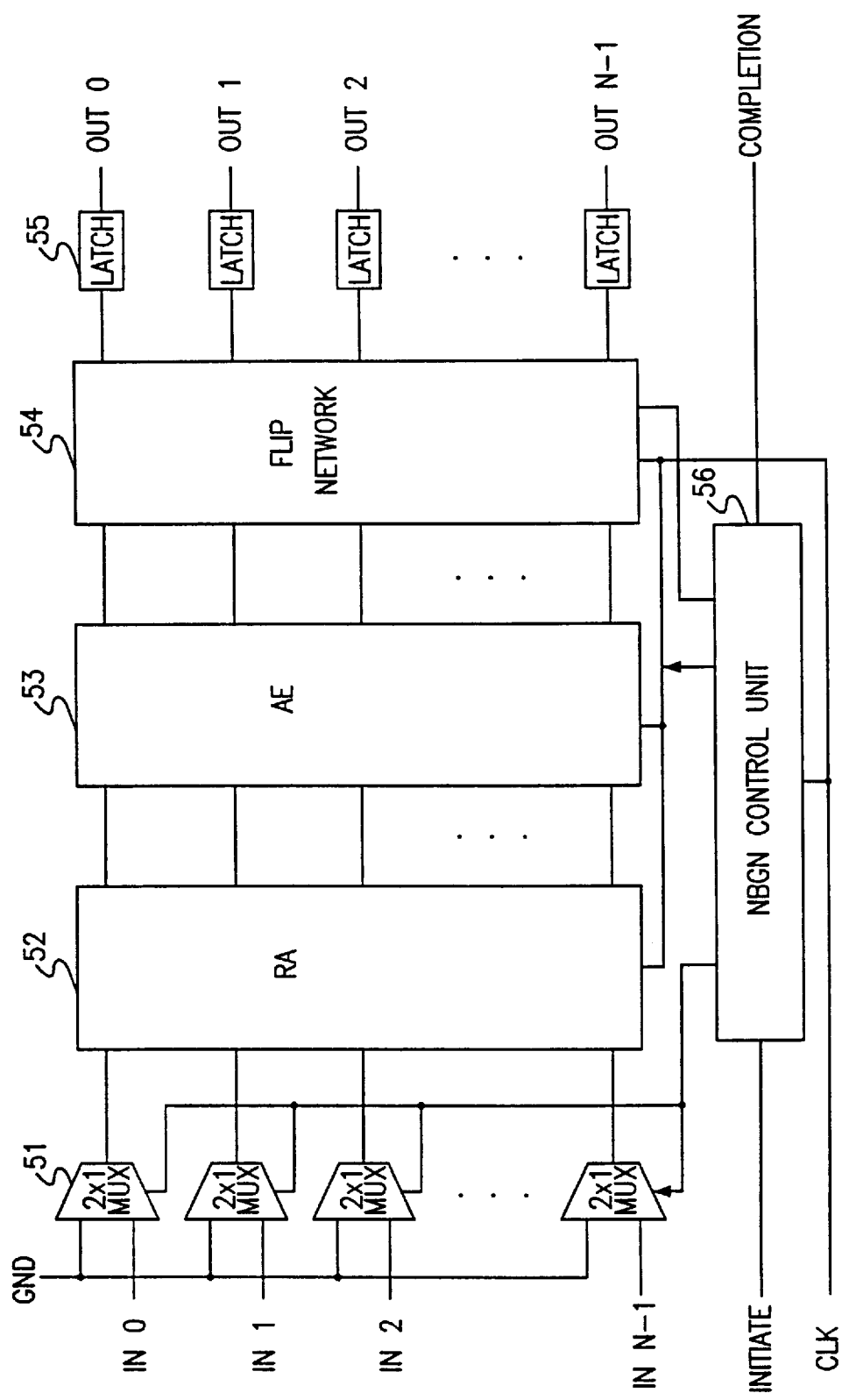
FIG. 5 is a diagram showing a detailed structure of the channel grouping unit shown in FIG. 2.

FIG. 5 shows the structure of a NBGN which is the channel grouping unit. Herein after N×K means N input lines and K output lines. 2×1 multiplexing unit 51 first synchronizes the data of an input port with an delayed signal DELAYED (INITIATE) inputted to the control unit of the NBGN 56 and then transmits the data to a Running Adder (RA) 52. In the case where the initiate signal is not inputted, the multiplexing unit always transmits value 0 to the RA 52. When data outputted from the 2×1 multiplexing unit 51 is transmitted to the RA 52, the RA continuously adds up the inputted bits for each input port.

Figure 6:
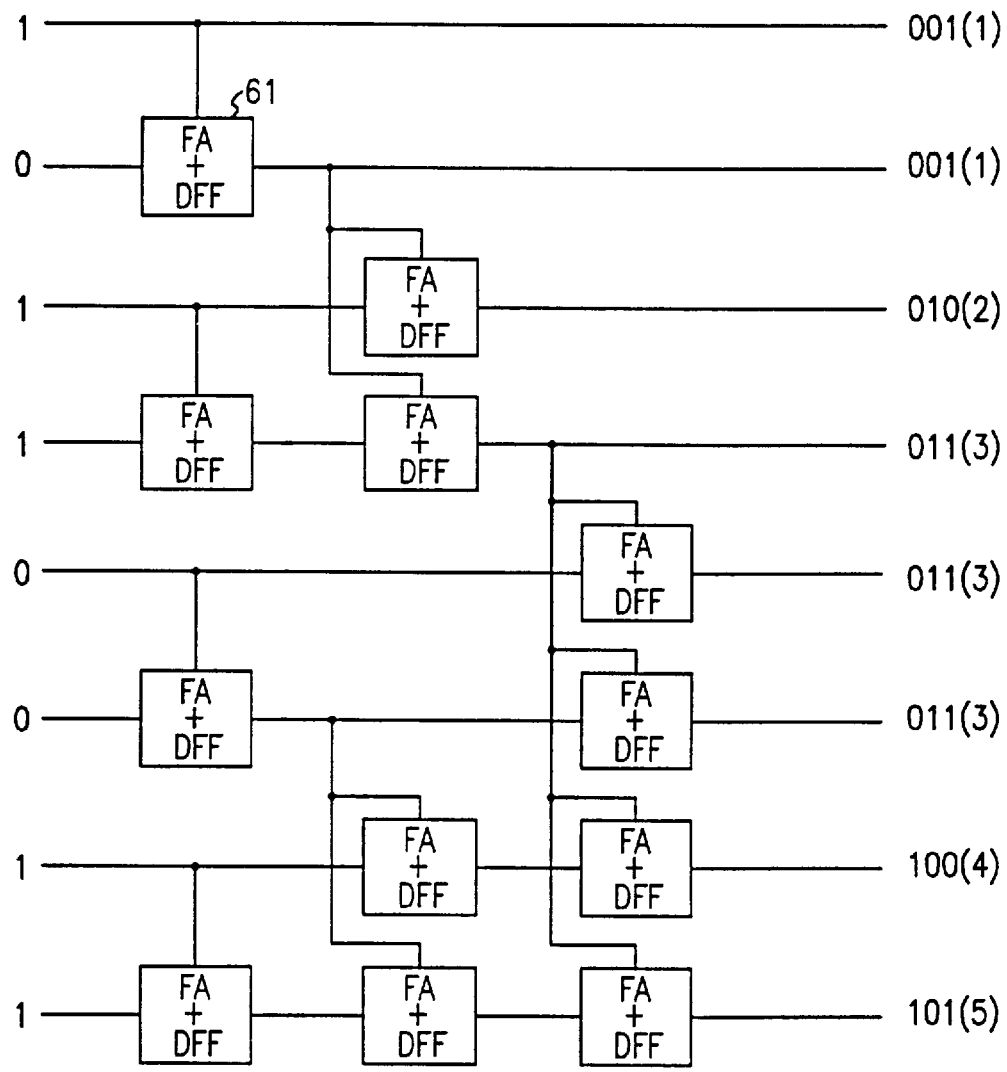
FIG. 6 is a diagram showing a detailed structure of the Running Adder (RA) shown in FIG. 5.

FIG. 6 shows the function of a RA in the case of eight input ports. The sum of inputted bits is shown in the output ports of RA 52. An input port has only one bit, but one output port has bits increasing with the number of input ports (three bits in this case), and generally r clocks are needed for the processing of RA. In this example, output bits of the RA, where r=$\log_2$ N (N is the number of input ports are expanded by the width of three bits. A RA having N input ports could be constructed to have expanded circuits in the same method.

Figure 7:
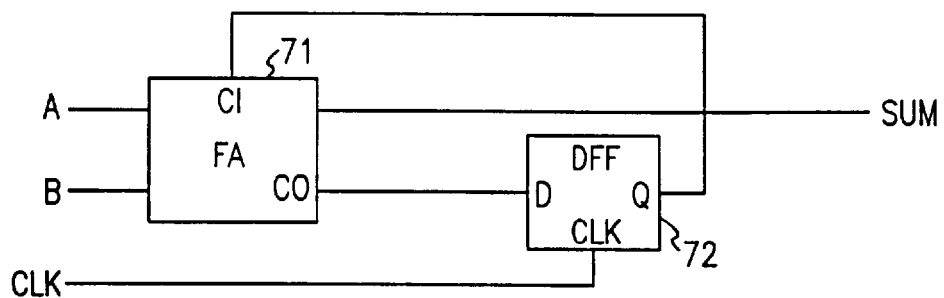
FIG. 7 is a diagram showing the structure of a Full Adder (FA) and D-flipflop shown in FIG. 6.

A RA element could have the structure of a Full Adder (FA), but the FA should have the structure as shown in FIG. 7 to synchronize the circuit operation with the clock.

FIG. 7 shows the structure of a FA operating synchronized with the clock. The input terminal (D) of the DFF 72 is connected to the carry-out terminal (CO) of the FA 71 and the output terminal (Q) of the DFF is returned by feedback and connected to the carry-in terminal (CI) of the FA. Hence, the output of RA is always synchronized with the clock and the initial value of the data outputted from the DFF before the start of the driving of RA is always set to be 0. The output data of the RA 52 is inputted to and encoded in the Address Encoder (AE) 53 as shown in FIG. 5.

Figure 8:
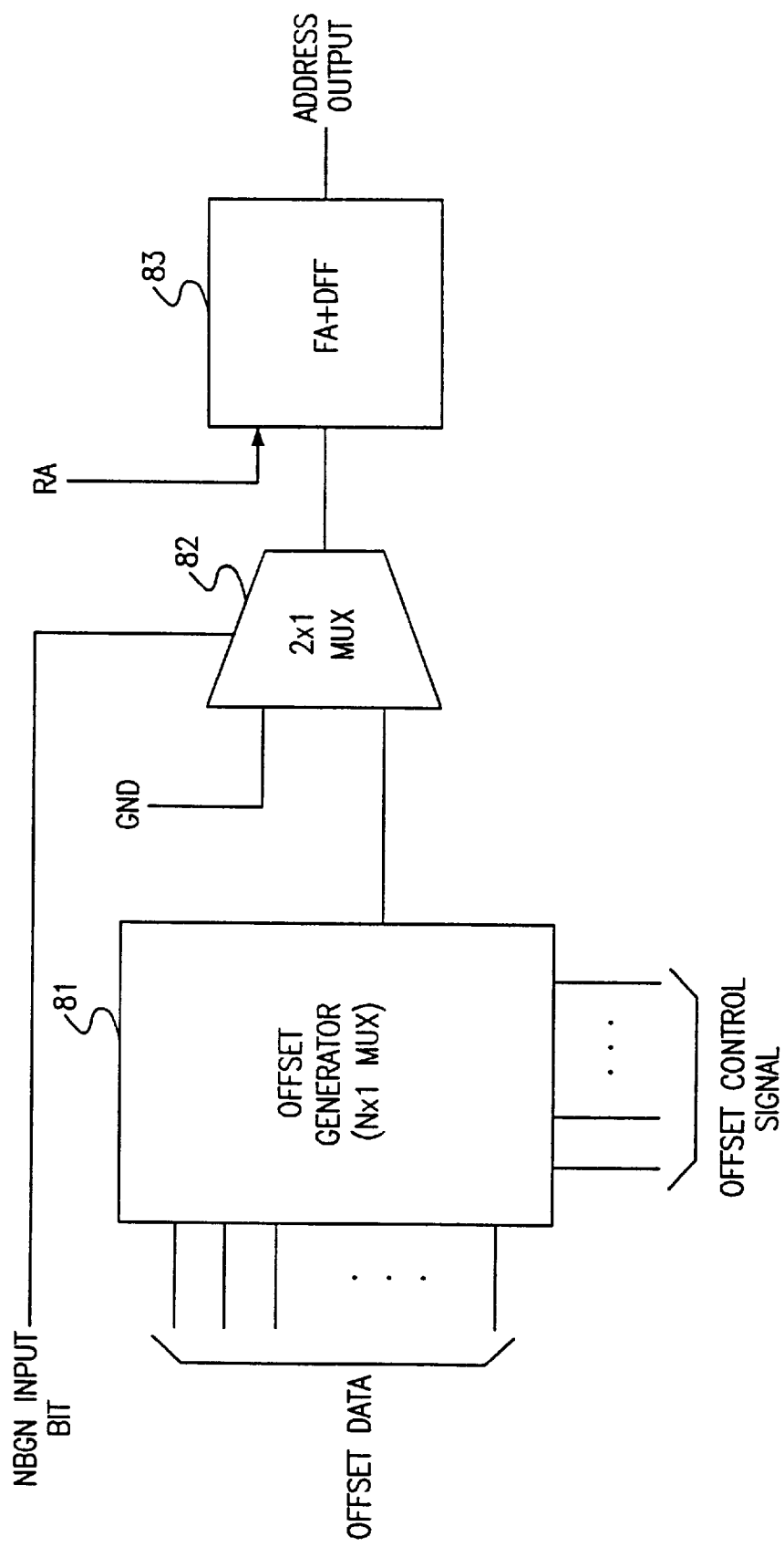
FIG. 8 is a diagram showing a detailed structure of the Address Encoder (AE) shown in FIG. 5.

FIG. 8 shows the detailed structure of an AE. A data firstly latched in NBGN has two values : 0, 1. When the data has value 0, the output data of the RA is inputted to the AE and then directly outputted through the output ports of AE. When the data has value 1, the offset data value and the output value of RA are added up and this added value is serially outputted through the output ports of AE. The offset data value is preset as N-i-1 (where N is the maximum number 0f input ports, i is the input port number). Hence, the AE outputs the total value of RA when the data latched in the NBGN has value 0, and N+(RA's total value)-i-1 when the data latched in the NBGN has value 1. N+(RA's total value)-i-1 could be a routing information of FLIP Network in reverse order.

The reading of the offset data and the outputting of data from the RA should be synchronized in the AE. Thus, the offset generator 81 is constructed as an N×1 multiplexer and this multiplexer uses, for the control signal thereof, a signal which is a combination of the initiate signal. 2×1 multiplexer 82 selects 0 or an offset value depending on the data value inputted from the NBGN. Finally, the FA combined with the DFF 83 adds the data values outputted from the RA and the 2×1 multiplexer and serially outputs the added value. The output data of AE 83 is inputted to the FLIP Network 54.

Figure 9A:
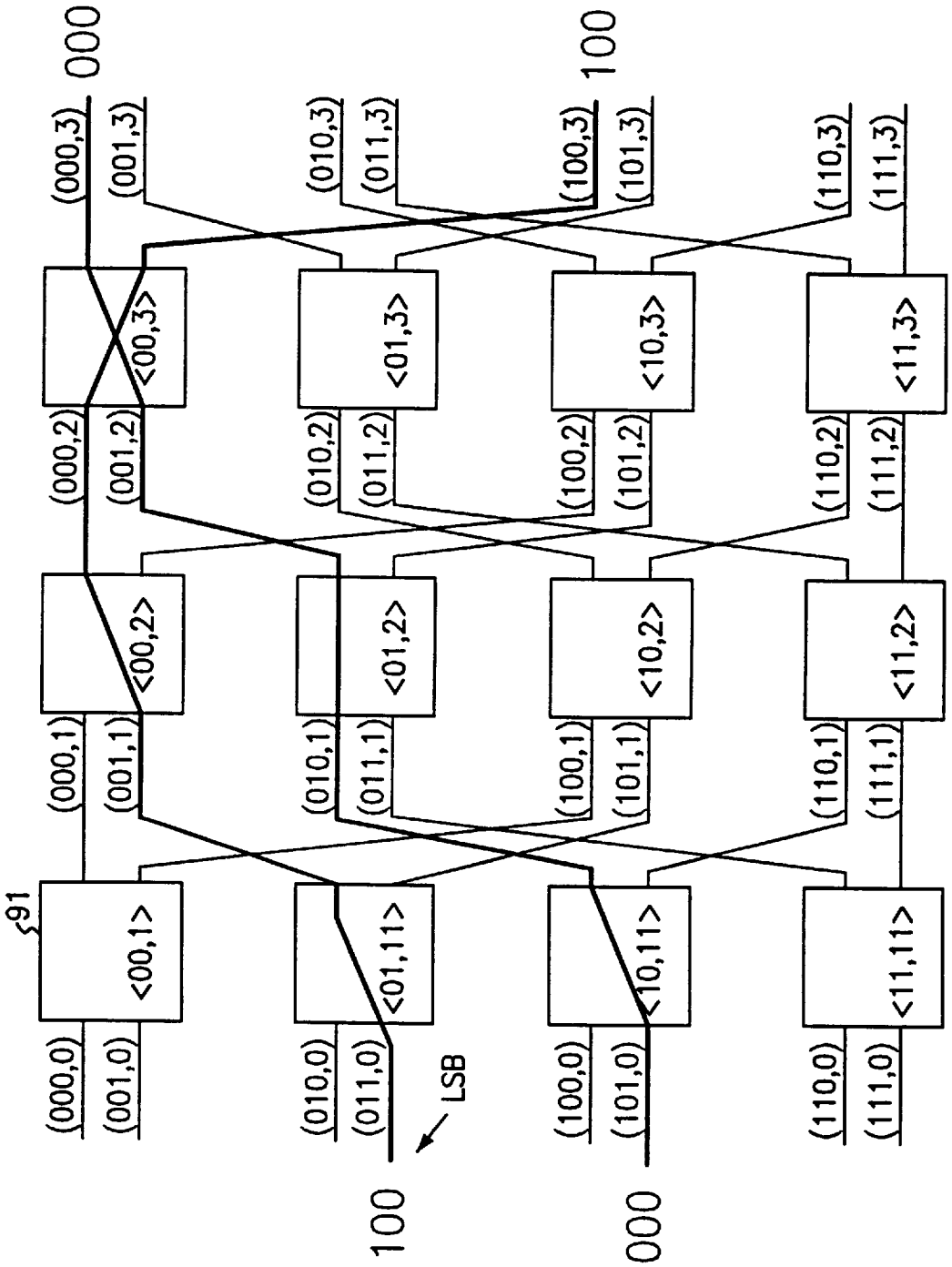
FIG. 9A is a diagram showing a detailed structure of the FLIP Network shown in FIG. 5.

FIG. 9A shows the detailed structure of a FLIP Network consisting of multiple 2×2 FLIP switching elements 91. A switching element outputs through upper output port or through lower output port when the inputted bit has values 0 or 1, respectively. The RA 52 and AE 53 of a NBGN, according to the present invention, prevent the possible collision which could occur in the FLIP Network when two inputted bits have the same value.

Figure 9B:
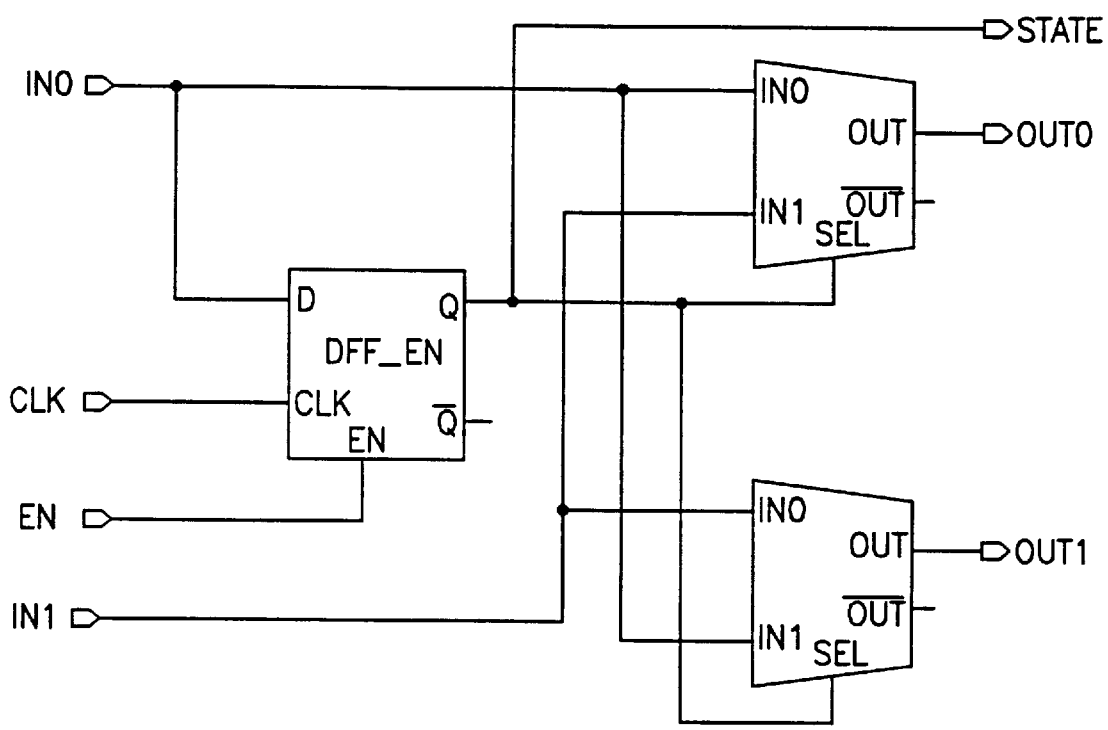
FIG. 9B is a diagram showing a circuit of FLIP Switching element shown in FIG. 9A.

FIG. 9B shows the defaulted structure FLIP switching element and how to prevent possible collision between adjacent two input. The upper port data(IN0) controls which input is selected in 2×1 Multiplexer. For example, IN0=1, IN0 data is out to OUT1 and IN1 is out to OUT0.

The connection of the 2×2 switching elements, as shown in FIG. 9A, results in 8-input FLIP Network. Least Significant Bit (LSB) should first be inputted to the FLIP Network, but since the RA and the AE first begin to output the LSB, the FLIP Network could be directly connected to the RA and the AE. The NBGN control unit 56 receives the delayed initiate signal and delays it through the DFFs only for the clock numbers needed in the NBGN, and generates a completion signal to drive the next NBGN or Trapping Unit, and using the delayed initiate signal, lets offset control signal occur. In the case of eight input ports, the NBGN control unit outputs offset control signals in the order of offset 0, offset 1, offset 2, offset 0, . . . , etc.

Figure 10:
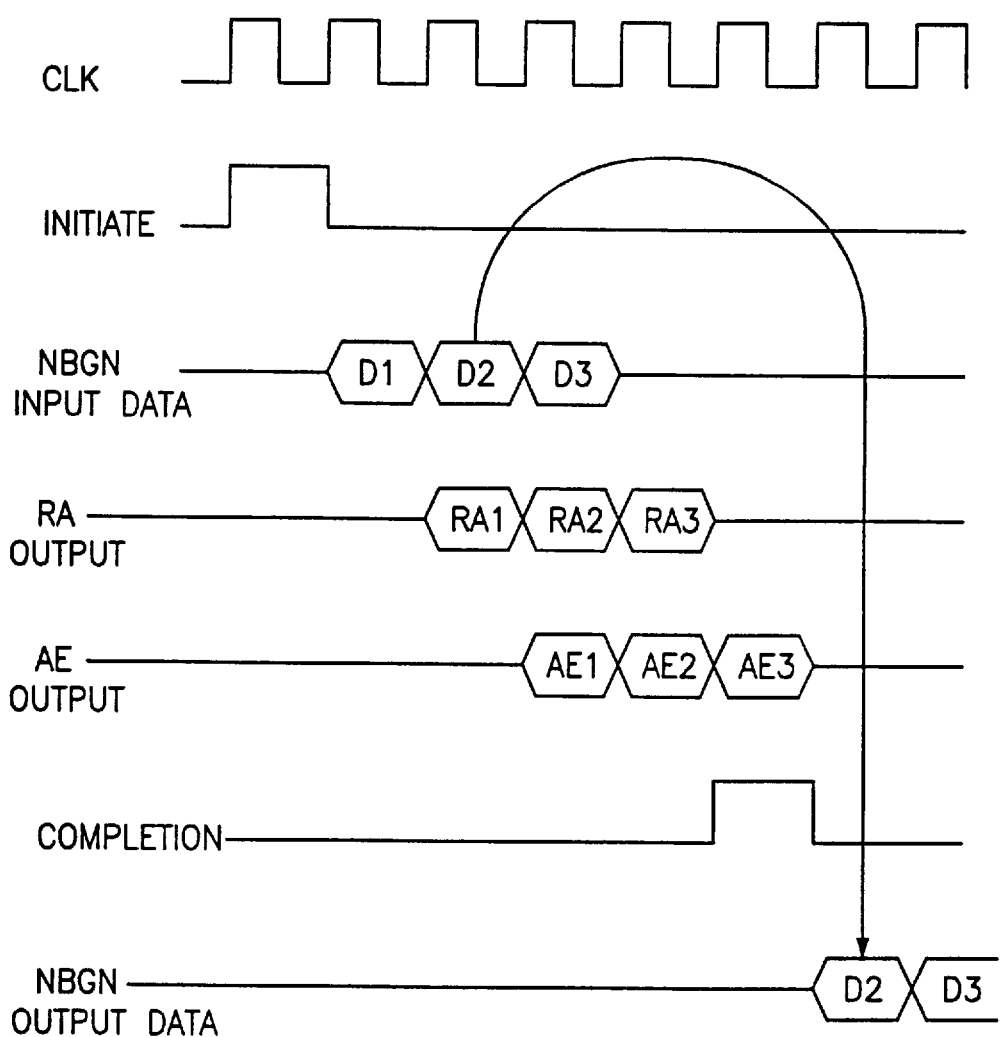
FIG. 10 is a diagram showing an operation timing example of the NBGN shown in FIG. 5.

FIG. 10 shows the operation timing when the NBGN has eight input ports. FIG. 10 shows that, after five clocks are used, the bit next to the firstly inputted bit of the NBGN is outputted through the FLIP Network.

Figure 11:
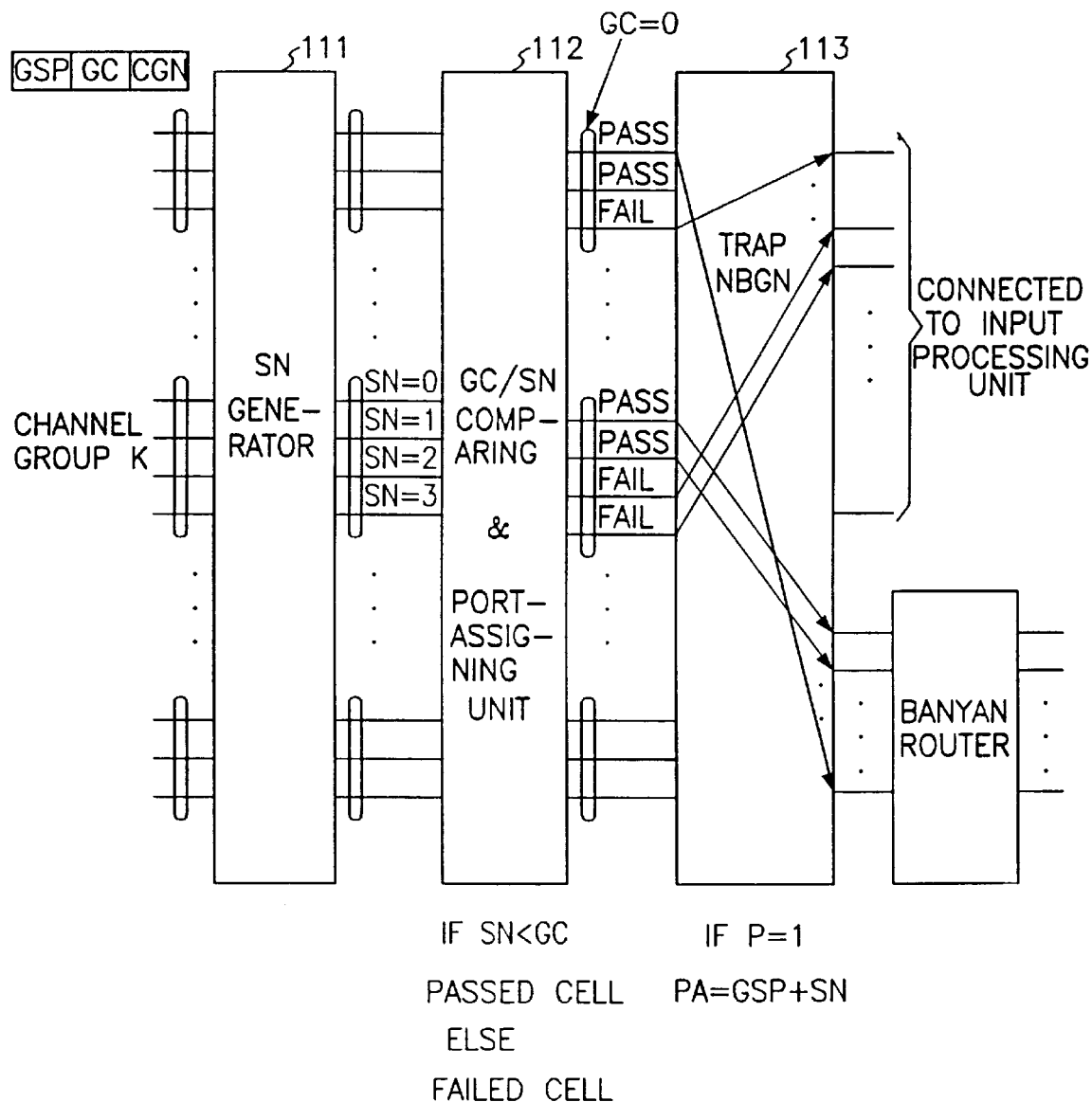
FIG. 11 is a diagram showing a detailed structure of the a trapping unit shown in FIG. 2.

FIG. 11 shows the detailed structure of the trapping unit 23. Channels grouped in the NBGN form adjacently arrayed port groups and the Sequence Number (SN) generating unit 111 assigns SN, sequentially from 0, to the pertinent ports in a same channel group. GC/SN Comparing and Port-Assigning 112 compares SN values of a pertinent channel with GC field value and partly blocks the cells and mark failed cell if the SN value is greater than the number of ports of the channel group to which the cells are outputted and mark passed cell and routes the cells to the TRAP NBGN unit 113 otherwise. Suppose, GC field value is 3 and the SN value of an arbitrary channel group is greater than 3. Then, the output ports which have SN value greater than 3 are blocked, and the unblocked cells are outputted through actual output ports numbered by the combined values of the GSP and SN in the GC/SN Comparing and Port-Assigning unit 112.

As shown in FIG. 11, the passed cells and the failed cells are mixed up in the output ports of the GC/SN Comparing and Port-Assigning unit 112. The trap NBGN 113 examines and regroups cells into two group using the passed/failed bits and separates blocked cells from unblocked cells. The blocked cells are returned to the input processing unit 21 by feedback, maintaining original cell formats thereof. These returned cells repeatedly go through the afore-mentioned processes and always have priority over externally inputted cells due to the structure of a multi-channel switch.

Figure 12:
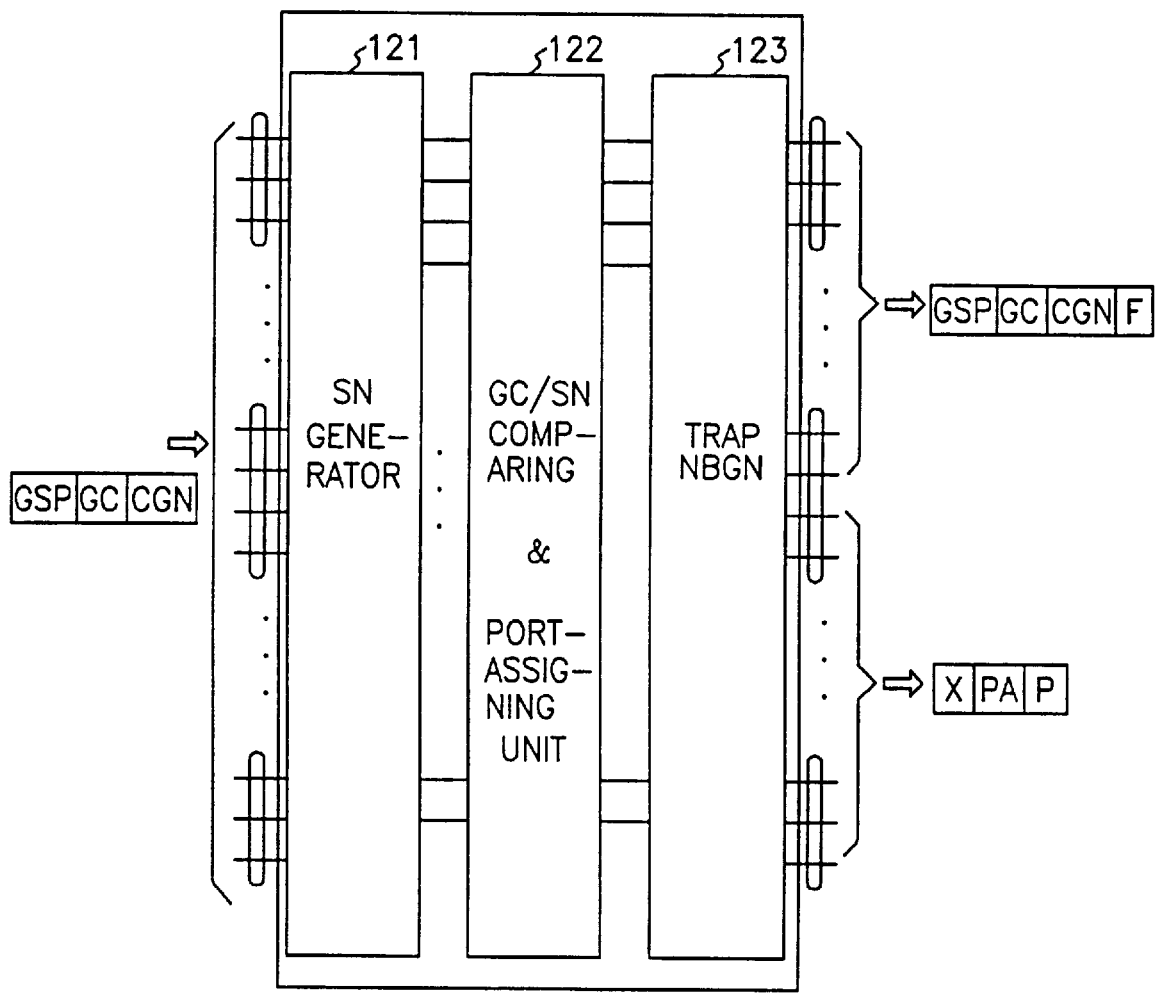
FIG. 12 is a diagram explaining a conversion process of the cell formats of the input and output data shown in FIG. 11.
Figure 13A:
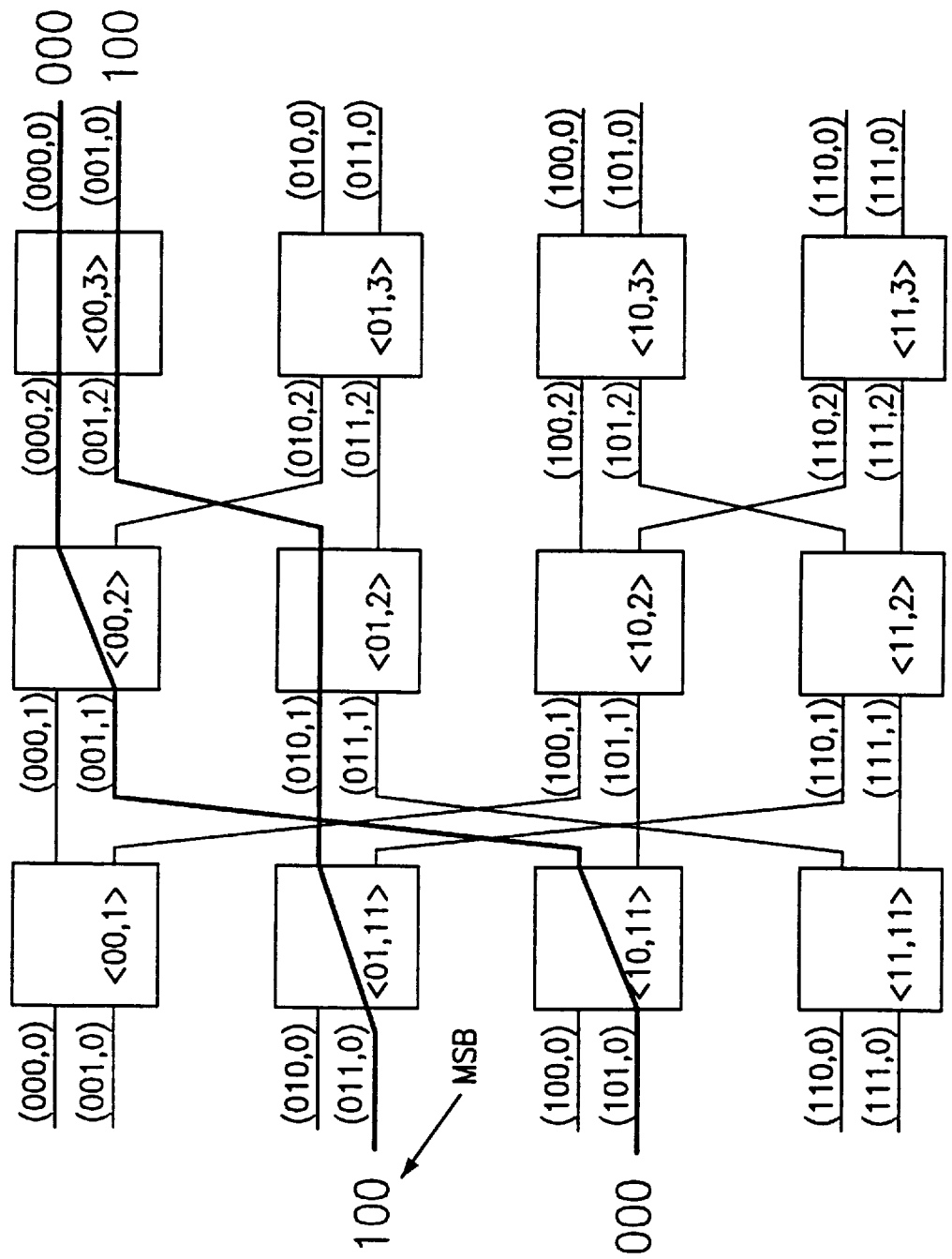
FIG. 13A is a diagram showing a structure of the Banyan network used as a routing unit in FIG. 2.

FIG. 12 explains the conversion process of cell formats of the input and output data. Port-Assigned (PA) bits could be self-routed in the routing unit 24 as shown in FIG. 2 (i.e., Banyan router) only when the bit next to the passed (P) bit is the most significant bit (MSB). X is don't care. Cells inputted to the routing network have Passed (P) bits and Port-Assigned (PA) bits in the formats thereof and the paths of cells to the Banyan network consisting of multiple Banyan switching elements, as shown in FIG. 13A, are set by the self-routing mode. Then data cells are transmitted through the paths.

Figure 13B:
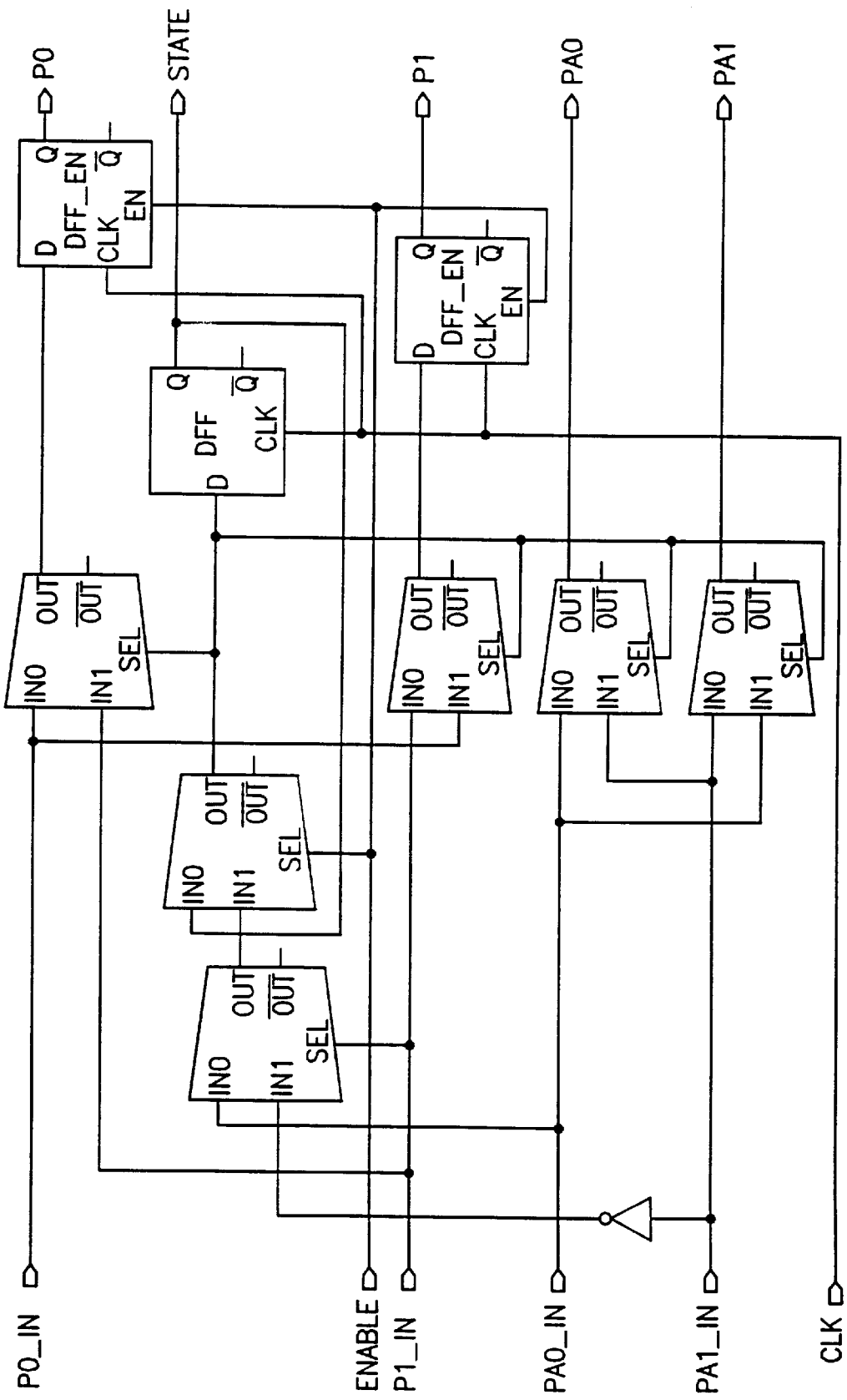
FIG. 13B is a diagram showing a detailed structure of Banyan Switching element in FIG. 13A.

FIG. 13B shows the detail structure of Banyan switching element and how to be self-routed using PA bit. If PA1_IN Bit is "1", data of input port P1_IN (passed bit) and PA1_IN (port assignment bit) are routed to output port P1 and PA1, respectively and otherwise routed to other ports.

Figure 14:
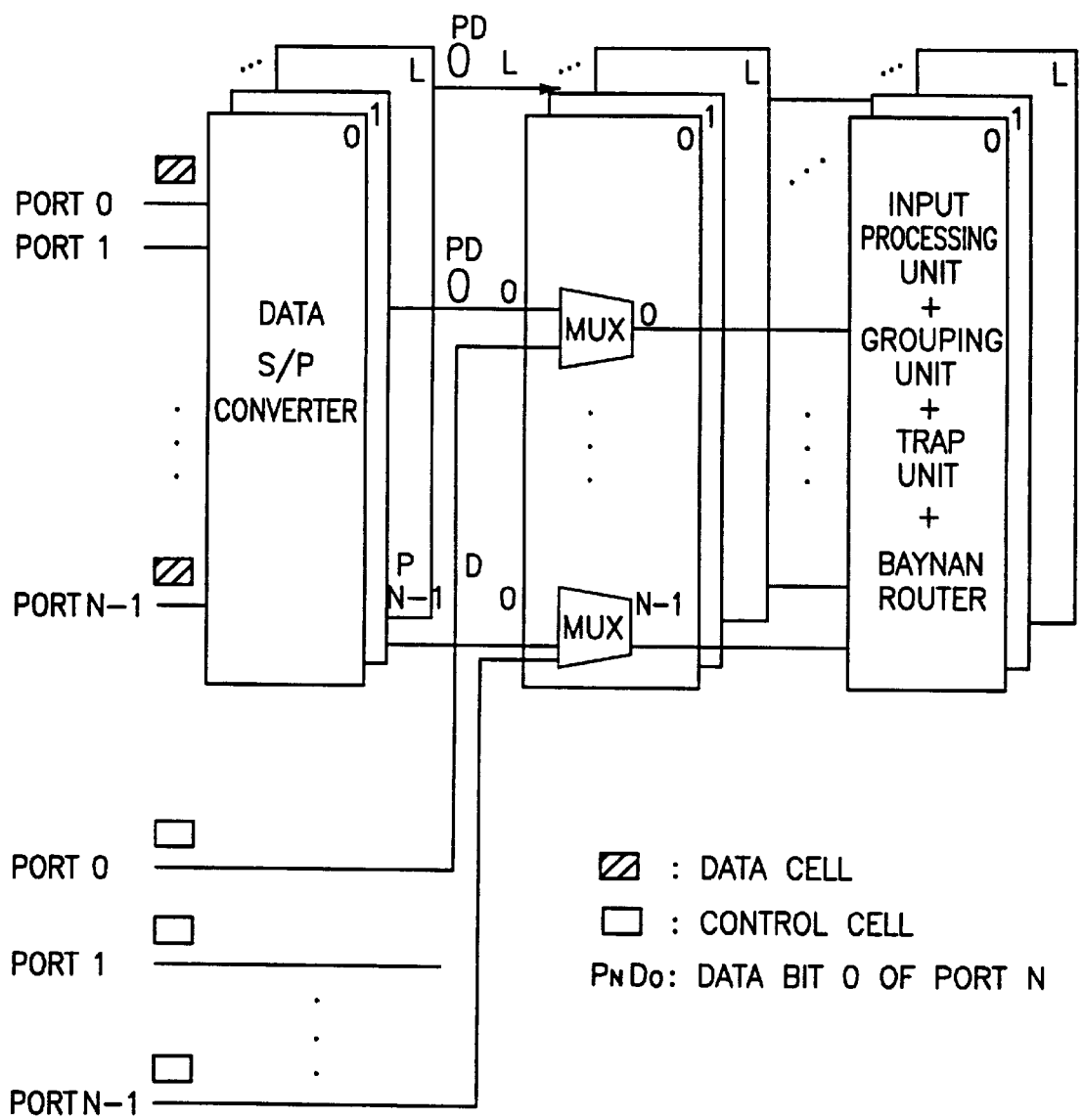
FIG. 14 is a diagram explaining one application example of the present invention.

But, under the circumstances of the present semiconductor technology, there are many problems in setting the switching paths for the high speed cells inputted into a multi-channel switch and outputting data cells, using the control cells. FIG. 14 introduces a device with a data serial/parallel converter to solve the problems in dealing with high speed inputted data. Using this device, the inputted data are first serially/parallelly converted and expanded by L bits, and next switched with the control cell data attached in front of the inputted data. This method allows the switching of high speed inputted cells by using a low speed clock, but increases the switching chip numbers by L, as shown in FIG. 14.

Figure 15:
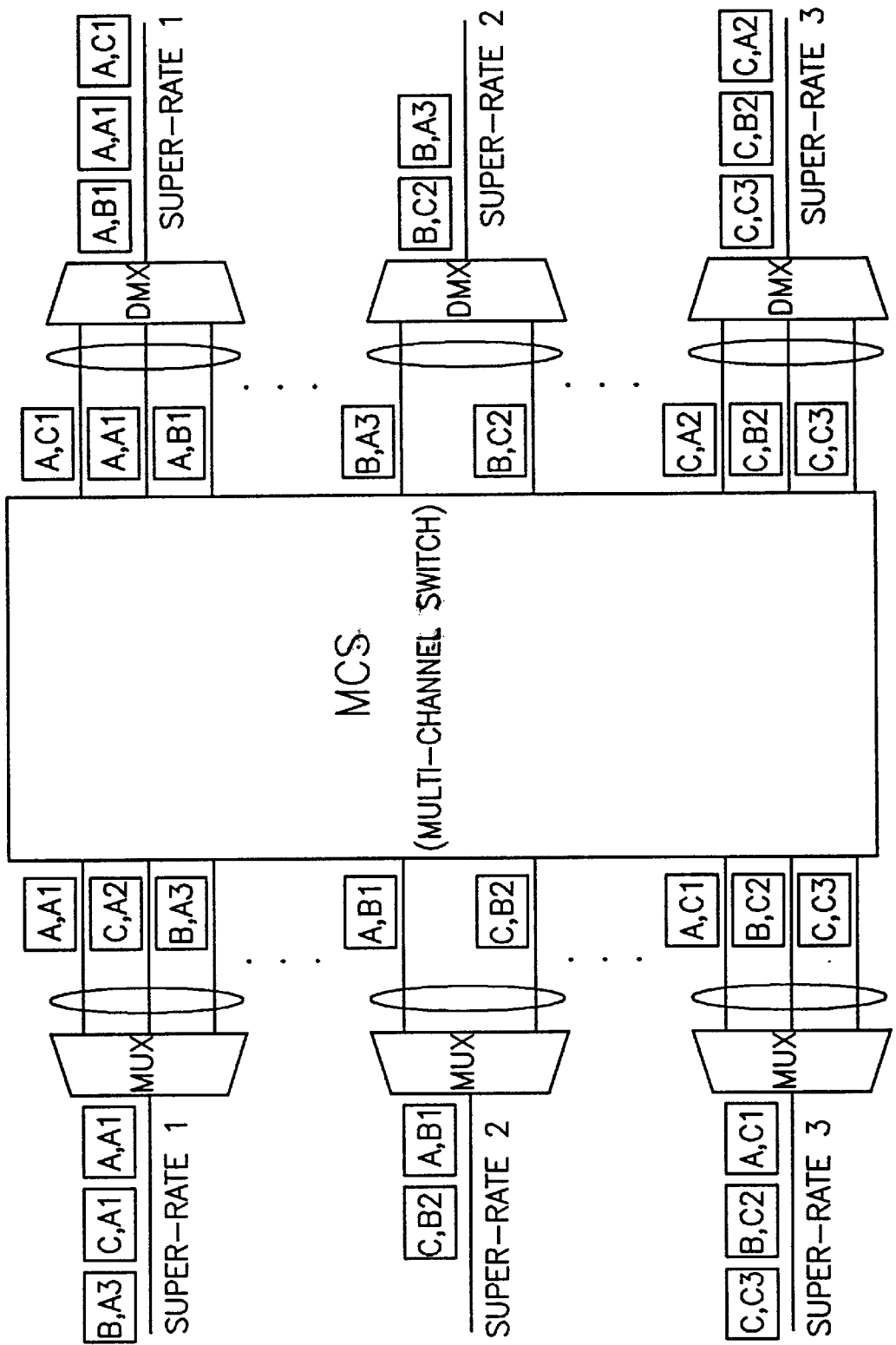
FIG. 15 is a diagram explaining another application example of the present invention.

FIG. 15 explains the method to accept the super-rate services. Demultiplexer first scatters inputted cells to multiple ports in a same channel group. The scattered cells are switched in the multi-channel switch and the switched cells are next multiplexed and outputted, thus allowing the cells, having a speedier input rate than the switching speed of the switch, to be executed because the switched cells maintain a cell order in a same channel group.

As explained above, the present invention could accept not only the services having higher speed than the speed of input ports, but also the services having super-rate speed by designating a port as a group.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An ATM multi-channel switch with a structure of grouping/trap/routing comprising:

an input processing means for executing reading control of externally inputted cells and adjusting synchronization between an externally inputted cell and a cell returned by blocking and feedback, said input processing means comprising:

a serially connected latching means, a number thereof being input port numbers plus one, for latching control cell data;

a multiplexing means for multiplexing each cell outputted from said latching means; and a multiplexing control means for controlling operations of said latching means and said multiplexing means, a channel grouping means for grouping cells outputted from said input processing means according to switching control data;

a trapping means for deciding whether cells grouped in said channel grouping means require switching beyond the capacity of the channel and, if these cells require switching beyond the capacity of the channel, sending them to said input processing means by feedback; and a routing means for routing cells outputted from said trapping means.

2. An ATM multi-channel switch with a structure of grouping/trap/routing according to claim 1, in which said multiplexing control means outputs one bit of the CGN (Channel Group Number) and, after r clocks are passed, wherein N=2 exp r, number of ports for externally inputted cells plus ports for cells reinputted by feedback, outputs next bit of the CGN.

3. An ATM multi-channel switch with a structure of grouping/trap/routing according to claim 1, in which said channel grouping means comprises:

a Non-Block Group Network (NBGN) control means for generating control signals for controlling each component according to externally imputted initiate signal and clock signal;

N multiplexing means for selectively outputting value "0" or external input data according to the control signals of said NBGN control means;

a Running Adder (RA) for continuously adding up the output data of said multiplexing means for each input port in the serial mode;

an Address Encoder (AE) for encoding the output data of said RA; and a FLIP Network for self-routing the output data of said AE, using port numbers generated in said AE.

4. An ATM multi-channel switch with a structure of grouping/trap/routing according to claim 3, in which said Running Adder (RA) comprises of multiple Full Adder (FA) operating synchronized with the clock signal.

5. An ATM multi-channel switch with a structure of grouping/trap/routing according to claim 3, in which said RA comprises:

a Full Adder (FA) for adding up two input data; and a D Flip-Flop (DFF) where the input port thereof is connected to the carry out terminal of said FA and the output port thereof is returned by feedback and connected to the carry in terminal of said FA.

6. An ATM multi-channel switch with a structure of grouping/trap/routing according to claim 3, in which said AE comprises:

an offset generating means for selectively outputting offset data externally inputted according to the offset control signal of said NBGN control means;

a multiplexing means for selectively outputting the value "0" or the output data of said offset generating means according to the input data of the NBGN; and an adding means for serially adding up the output data of said RA and the output data of said multiplexing means.

7. An ATM multi-channel switch with a structure of grouping/trap/routing according to claim 1, in which said trapping means comprises:

a Sequence Number (SN) generating means for assigning SN's to the pertinent ports of a channel in a same channel group;

a GC(Group Capacity)/SN Comparing and Port-Assigning means for comparing SN's assigned in said SN generating means and GC field values, and classifying inputted cells as blocked cells or unblocked cells; and a trap NBGN means for returning the blocked cells outputted from said GC/SN, Comparing and Port-Assigning means to said input processing means by feedback and outputting unblocked cells to said routing means.

8. An ATM multi-channel switch with a structure of grouping/trap/routing according to claim 1, in which said routing means is constructed as a Banyan network.

* * * * *